United States Patent
Takama

(10) Patent No.: US 11,128,813 B2
(45) Date of Patent: Sep. 21, 2021

(54) IMAGE PROCESSING APPARATUS, IMAGE PROCESSING SYSTEM, IMAGE PROCESSING METHOD, AND STORAGE MEDIUM

(71) Applicant: CANON KABUSHIKI KAISHA, Tokyo (JP)

(72) Inventor: Yasufumi Takama, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/396,281

(22) Filed: Apr. 26, 2019

(65) Prior Publication Data

US 2019/0253639 A1    Aug. 15, 2019

Related U.S. Application Data

(63) Continuation of application No. PCT/JP2017/037978, filed on Oct. 20, 2017.

(30) Foreign Application Priority Data

Oct. 28, 2016 (JP) .............................. JP2016-211905

(51) Int. Cl.
*H04N 5/247* (2006.01)
*H04N 5/222* (2006.01)
(Continued)

(52) U.S. Cl.
CPC .............. *H04N 5/247* (2013.01); *G06T 15/20* (2013.01); *H04N 5/2224* (2013.01);
(Continued)

(58) Field of Classification Search
CPC ........ G06T 15/20; H04N 13/00; H04N 13/10; H04N 5/2224; H04N 5/23232; H04N 5/247; H04N 5/2628
See application file for complete search history.

(56) References Cited

U.S. PATENT DOCUMENTS 8,270,767 B2 * 9/2012 Park ................. G08B 13/19641
382/284
8,277,316 B2 * 10/2012 Haigh-Hutchinson ......................
A63F 13/04
463/31

(Continued)

FOREIGN PATENT DOCUMENTS

CN    2001078233 A    3/2001
CN    1694512 A       11/2005
(Continued)

OTHER PUBLICATIONS

Gregor Miller et al; Interactive free-viewpoint video; Centre for Vision, Speech and Signal Processing, University of Surrey, Guildford; pp. 1-11.

(Continued)

*Primary Examiner* — Ming Wu
(74) *Attorney, Agent, or Firm* — Canon U.S.A., Inc. IP Division

(57) ABSTRACT

An image processing system includes an image obtaining unit that obtains images based on capturing from plural directions by plural cameras, an information obtaining unit that obtains viewpoint information indicating a virtual viewpoint, and a generation unit configured to generate virtual viewpoint images on a basis of the obtained images and viewpoint information. The generation unit generates a first virtual viewpoint image outputted to a display apparatus that displays an image for a user to specify a virtual viewpoint and a second virtual viewpoint image outputted to an output destination different from the display apparatus by using at least one of data generated in a process for generating the first virtual viewpoint image by image processing using the plural images obtained by the image obtaining unit and the first virtual viewpoint image, the second virtual viewpoint (Continued)

image having a higher image quality than that of the first virtual viewpoint image.

17 Claims, 6 Drawing Sheets

(51) Int. Cl.
*H04N 5/232* (2006.01)
*H04N 5/262* (2006.01)
*H04N 13/00* (2018.01)
*H04N 13/10* (2018.01)
*G06T 15/20* (2011.01)

(52) U.S. Cl.
CPC ....... *H04N 5/23232* (2013.01); *H04N 5/2628* (2013.01); *H04N 13/00* (2013.01); *H04N 13/10* (2018.05)

(56) References Cited

U.S. PATENT DOCUMENTS

| | | | | |
|---|---|---|---|---|
| 8,611,674 | B1 * | 12/2013 | Beeler | G06K 9/4661 382/103 |
| 8,620,772 | B2 * | 12/2013 | Owen | H05B 47/11 705/26.9 |
| 8,711,923 | B2 * | 4/2014 | Perlman | H04L 67/38 375/240.01 |
| 9,041,722 | B2 * | 5/2015 | Gloudemans | G06T 15/20 345/582 |
| 9,462,301 | B2 * | 10/2016 | Pa ko | H04N 21/21805 |
| 2002/0049979 | A1 * | 4/2002 | White | H04N 21/4314 725/87 |
| 2002/0061131 | A1 | 5/2002 | Sawhney | |
| 2007/0122027 | A1 | 5/2007 | Kunita | |
| 2013/0135315 | A1 | 5/2013 | Bares et al. | |
| 2013/0342647 | A1 | 12/2013 | Takahashi | |
| 2014/0270706 | A1 | 9/2014 | Pasko | |
| 2014/0347450 | A1 | 11/2014 | Han | |

FOREIGN PATENT DOCUMENTS

| | | |
|---|---|---|
| CN | 101080741 A | 11/2007 |
| CN | 102801997 A | 11/2012 |
| CN | 104238739 A | 12/2014 |
| CN | 105052154 A | 11/2015 |
| JP | 2004-280250 A | 10/2004 |
| JP | 2007150747 A | 6/2007 |
| JP | 2009027564 A | 2/2009 |
| JP | 2011135138 A | 7/2011 |
| JP | 2013175988 A | 9/2013 |
| JP | 2013223008 A | 10/2013 |
| JP | 2016010145 A | 1/2016 |
| JP | 2016519546 A | 6/2016 |
| KR | 10-1224221 B1 | 1/2013 |
| KR | 10-1265711 B1 | 5/2013 |
| RU | 2013122872 A | 11/2014 |
| RU | 2554069 C2 | 6/2015 |
| WO | 2004/053591 A1 | 6/2004 |
| WO | 2013/187129 A1 | 12/2013 |
| WO | 2014/191990 A1 | 12/2014 |

OTHER PUBLICATIONS

Itaru Kitahara et al; Real-time 3D Video Display of Humans in a Large-scale Space; Technical Report of IEICE, vol. 102, No. 532, pp. 43-48.

Itaru Kitahara; Scalable 3D Representation for 3D Video Display in a Large-scale Space; Proceedings of the IEEE Virtual Reality 2003 (VR'03);pp. 1-8.

Hansung Kim; A Real-Time 3D Modeling System Using Multiple Stereo Cameras for Free-Viewpoint Video Generation; Image Analysis and Recognition: Third International Conference, pp. 237-249.

Itaru Kitahara, Scalable 3D representation for 3D video display in a large-scale space, IEEE Virtual Reality, 2003, 3 pages, IEEE Computer Society.

* cited by examiner

IMAGE PROCESSING APPARATUS, IMAGE PROCESSING SYSTEM, IMAGE PROCESSING METHOD, AND STORAGE MEDIUM

CROSS-REFERENCE TO RELATED APPLICATIONS

This application is a Continuation of International Patent Application No. PCT/JP2017/037978, filed Oct. 20, 2017, which claims the benefit of Japanese Patent Application No. 2016-211905, filed Oct. 28, 2016, both of which are hereby incorporated by reference herein in their entirety.

TECHNICAL FIELD

The present invention relates to a technology for generating a virtual viewpoint image.

BACKGROUND ART

In recent days, a technology for capturing a subject from multiple viewpoints by installing a plurality of cameras in different positions and generating a virtual viewpoint image or a three-dimensional model by using a plurality of viewpoint images obtained by the capturing has attracted attention. According to the technology for generating the virtual viewpoint image from the plurality of viewpoint images as described above, for example, since a highlight scene in soccer or basketball can be viewed from various angles, it is possible to provide high realistic sensation to a user as compared with a normal image.

According to PTL 1, it is described that an image quality of the virtual viewpoint image is improved by decreasing units of rendering in a boundary area of an object in the image in a case where a virtual viewpoint image is to be generated by combining the images captured from the plurality of viewpoints with one another.

CITATION LIST

Patent Literature

PTL 1 Japanese Patent Laid-Open No. 2013-223008

However, according to the related-art technology, it is conceivable that a virtual viewpoint image in accordance with a plurality of different requirements with regard to an image quality cannot be generated in some cases. For example, in a case where only the virtual viewpoint image having the high image quality is to be generated, it is conceivable that a processing time related to the generation is lengthened, and there is a fear that it becomes difficult to respond to a desire of a user who would like to observe the virtual viewpoint image in real time even though the image quality is low. On the other hand, in a case where only the virtual viewpoint image having the low image quality is to be generated, there is a fear that it becomes difficult to respond to a desire of a user who prioritizes the high image quality of the virtual viewpoint image over real-time property.

The present invention has been made in view of the above-described problem and is aimed at generating a virtual viewpoint image in accordance with a plurality of different requirements with regard to an image quality.

SUMMARY OF INVENTION

To solve the above-described problem, an image processing apparatus according to the present invention includes, for example, the following configuration. That is, the image processing apparatus includes an image obtaining unit configured to obtain images based on capturing from a plurality of directions by a plurality of cameras, an information obtaining unit configured to obtain viewpoint information indicating a virtual viewpoint, and a generation unit configured to generate virtual viewpoint images on a basis of the images obtained by the image obtaining unit and the viewpoint information obtained by the information obtaining unit, in which the generation unit is configured to generate a first virtual viewpoint image to be outputted to a display apparatus that displays an image for a user to specify a virtual viewpoint and also configured to generate a second virtual viewpoint image to be outputted to an output destination different from the display apparatus by using at least one of data generated in a process for generating the first virtual viewpoint image by image processing using the plurality of images obtained by the image obtaining unit and the first virtual viewpoint image, the second virtual viewpoint image having a higher image quality than that of the first virtual viewpoint image.

Further features of the present invention will become apparent from the following description of exemplary embodiments with reference to the attached drawings.

DESCRIPTION OF EMBODIMENTS

System Configuration

Figure 1:
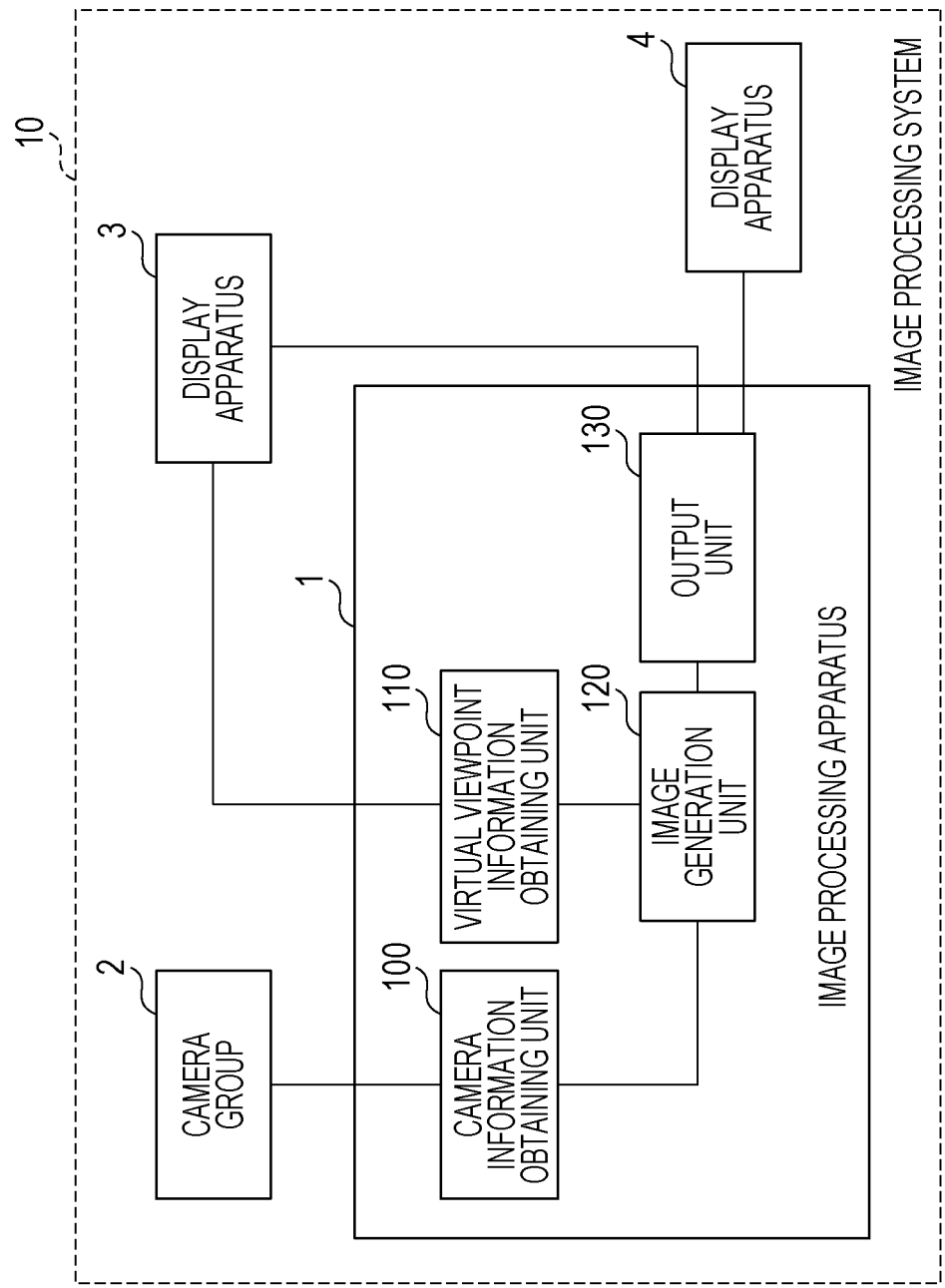
FIG. 1 is an explanatory diagram for describing a configuration of an image processing system 10.

Hereinafter, embodiments of the present invention will be described with reference to the drawings. First, a configuration of an image processing system 10 that generates and outputs a virtual viewpoint image will be described by using FIG. 1. The image processing system 10 according to the present embodiment includes an image processing apparatus 1, a camera group 2, a display apparatus 3, and a display apparatus 4.

It should be noted that the virtual viewpoint image according to the present embodiment is an image obtained in a case where a subject is captured from a virtual viewpoint. In other words, the virtual viewpoint image is an image representing an appearance at a specified viewpoint. The virtual viewpoint (imaginary viewpoint) may be specified by a user or may also be automatically specified on the basis of a result of an image analysis or the like. That is, the virtual viewpoint image includes an arbitrary viewpoint image (free viewpoint image) corresponding to a viewpoint arbitrarily specified by the user. In addition, an image corresponding to a viewpoint specified by the user from among a plurality of candidates and an image corresponding to a viewpoint automatically specified by an apparatus are also included in the virtual viewpoint image. It should be noted that, according to the present embodiment, a case where the virtual viewpoint image is a moving image will be mainly described, but the virtual viewpoint image may also be a still image.

The camera group 2 includes a plurality of cameras, and each of the cameras captures a subject from respectively different directions. According to the present embodiment, each of the plurality of cameras included in the camera group 2 is connected to the image processing apparatus 1 and transmits a captured image, a parameter of each camera, and the like to the image processing apparatus 1. It should be noted however that the configuration is not limited to this, and the plurality of cameras included in the camera group 2 may be mutually communicable, and any one of the cameras included in the camera group 2 may transmit the captured images by the plurality of cameras, the parameters of the plurality of cameras, and the like to the image processing apparatus 1. In addition, instead of the captured images, any one of the cameras included in camera group 2 may transmit an image based on the capturing by the camera group 2 such as an image generated on the basis of a difference between the captured images by the plurality of cameras.

The display apparatus 3 accepts the specification of the virtual viewpoint for generating the virtual viewpoint image and transmits the information in accordance with the specification to the image processing apparatus 1. For example, the display apparatus 3 includes an input unit such as a joystick, a jog dial, a touch panel, a keyboard, or a mouse, and the user (operator) who specifies the virtual viewpoint operates the input unit to specify the virtual viewpoint. The user according to the present embodiment is an operator who operates an input unit of the display apparatus 3 to specify the virtual viewpoint or a viewer who observes the virtual viewpoint image displayed by the display apparatus 4, and the user is simply mentioned in a case where the operator and the viewer are not particularly distinguished from each other. According to the present embodiment, the case where the viewer is different from the operator will be mainly described, but the configuration is not limited to this, and the viewer and the operator may be the same user. It should be noted that, according to the present embodiment, the information in accordance with the specification of the virtual viewpoint which is transmitted from the display apparatus 3 to the image processing apparatus 1 is the virtual viewpoint information indicating the position and the orientation of the virtual viewpoint. It should be noted however that the configuration is not limited to this, and the information in accordance with the specification of the virtual view point may be information indicating the contents determined in accordance with the virtual view point such as the shape or the orientation of the subject in the virtual viewpoint image, and the image processing apparatus 1 may generate the virtual viewpoint image on the basis of the above-described information in accordance with the specification of the virtual viewpoint.

Furthermore, the display apparatus 3 displays the virtual viewpoint image generated and output by the image processing apparatus 1 on the basis of the images based on the capturing by the camera group 2 and the specification of the virtual viewpoint accepted by the display apparatus 3. According to this, the operator can perform the specification of the virtual viewpoint while observing the virtual viewpoint image displayed on the display apparatus 3. It should be noted that, according to the present embodiment, the display apparatus 3 that displays the virtual viewpoint image is configured to accept the specification of the virtual viewpoint, but the configuration is not limited to this. For example, the apparatus that accepts the specification of the virtual viewpoint and the display apparatus that displays the virtual viewpoint image for the operator to specify the virtual viewpoint may be separate apparatuses.

The display apparatus 3 also performs a generation instruction for starting the generation of the virtual viewpoint image with respect to the image processing apparatus 1 on the basis of the operation by the operator. It should be noted that the generation instruction is not limited to this and may be an instruction for the image processing apparatus 1 to reserve the generation of the virtual viewpoint image such that the generation of the virtual viewpoint image is started at a predetermined time, for example. In addition, the generation instruction may be an instruction for a reservation such that the generation of the virtual viewpoint image is started in a case where a predetermined event occurs, for example. It should be noted that the apparatus that performs the generation instruction of the virtual viewpoint image with respect to the image processing apparatus 1 may be an apparatus different from the display apparatus 3, and the user may directly input the generation instruction with respect to the image processing apparatus 1.

The display apparatus 4 displays the virtual viewpoint image generated by the image processing apparatus 1 on the basis of the specification of the virtual viewpoint by the operator who has used the display apparatus 3 with respect to the user (viewer) different from the operator who specifies the virtual viewpoint. It should be noted that the image processing system 10 may include a plurality of display apparatuses 4, and the plurality of display apparatuses 4 may display respectively different virtual viewpoint images. For example, the display apparatus 4 that displays the virtual viewpoint image (live image) to be broadcast live and the display apparatus 4 that displays the virtual viewpoint image (non-live image) to be broadcast after recording may be included in the image processing system 10.

The image processing apparatus 1 includes a camera information obtaining unit 100, a virtual viewpoint information obtaining unit 110 (hereinafter, the viewpoint obtaining unit 110), an image generation unit 120, and an output unit 130. The camera information obtaining unit 100 obtains the images based on the capturing by the camera group 2, external parameters and internal parameters of the respective cameras included in the camera group 2, and the like from the camera group 2 to be output to the image generation unit 120. The viewpoint obtaining unit 110 obtains the information in accordance with the specification of the virtual viewpoint by the operator from the display apparatus 3 to be output to the image generation unit 120. The viewpoint obtaining unit 110 also accepts the generation instruction of the virtual viewpoint image by the display apparatus 3. The image generation unit 120 generates the virtual viewpoint image on the basis of the images based on the capturing which are obtained by the camera information obtaining unit 100, the information in accordance with the specification obtained by the viewpoint obtaining unit 110, and the generation instruction accepted by the viewpoint obtaining unit 110 to be output to the output unit 130. The output unit 130 outputs the virtual viewpoint image generated by the image generation unit 120 to the external apparatus such as the display apparatus 3 or the display apparatus 4.

It should be noted that, according to the present embodiment, the image processing apparatus 1 generates the plurality of virtual viewpoint images having the different image qualities to be output to the output destinations in accordance with the respective virtual viewpoint images. For example, the virtual viewpoint image having the low image quality in which processing time related to the generation is short is output to the display apparatus 4 observed by the viewer who desires the real-time (low-delay) virtual viewpoint image. On the other hand, the virtual viewpoint image having the high image quality in which the processing time related to the generation is long is output to the display apparatus 4 observed by the viewer who desires the virtual viewpoint image having the high image quality. It should be noted that the delay according to the present embodiment corresponds to a period from when the capturing by the camera group 2 is performed until the virtual viewpoint image based on the capturing is displayed. It should be noted however that the definition of the delay is not limited to this, and for example, a time difference between a real-world time and a time corresponding to the displayed image may be set as the delay.

Figure 2:
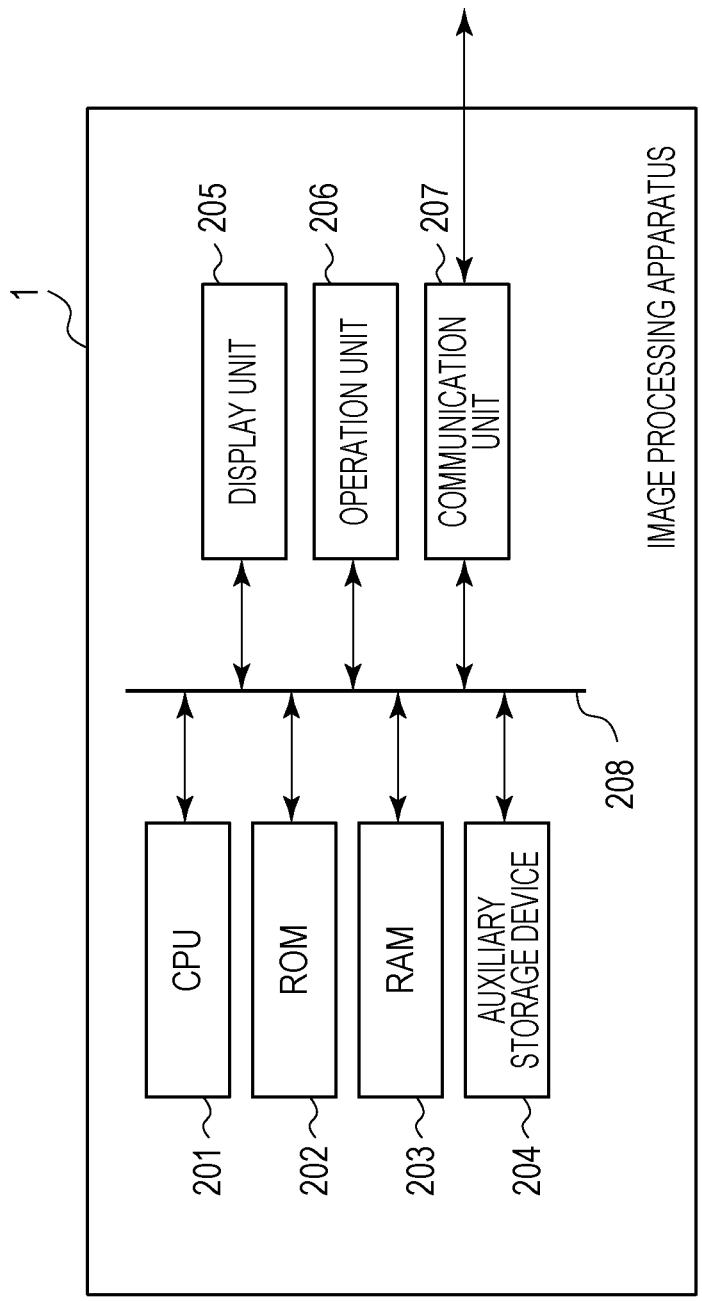
FIG. 2 is an explanatory diagram for describing a hardware configuration of an image processing apparatus 1.

Subsequently, a hardware configuration of the image processing apparatus 1 will be described by using FIG. 2. The image processing apparatus 1 includes a CPU 201, a ROM 202, a RAM 203, an auxiliary storage device 204, a display unit 205, an operation unit 206, a communication unit 207, and a bus 208. The CPU 201 controls the entirety of the image processing apparatus 1 by using the computer programs and data stored in the ROM 202 or the RAM 203. It should be noted that the image processing apparatus 1 may include a GPU (Graphics Processing Unit), and the GUI may perform at least part of the processing by the CPU 201. The ROM 202 stores the programs and parameters that do not require changes. The RAM 203 temporarily stores the programs and data supplied from the auxiliary storage device 204, data supplied from the outside via the communication unit 207, and the like. The auxiliary storage device 204 is constituted, for example, by a hard disc drive or the like and stores contents data such as a still image and a moving image.

The display unit 205 is constituted, for example, by a liquid crystal display or the like and displays a GUI (Graphical User Interface) for the user to operate the image processing apparatus 1 and the like. The operation unit 206 is constituted, for example, by a keyboard, a mouse, or the like and accepts the operations by the user and inputs various instructions to the CPU 201. The communication unit 207 performs a communication with an external apparatus such as the camera group 2, the display apparatus 3, or the display apparatus 4. For example, a LAN cable or the like is connected to the communication unit 207 in a case where the image processing apparatus 1 is connected to the external apparatus in a wired manner. It should be noted that, in a case where the image processing apparatus 1 includes a function for wirelessly communicating with an external apparatus, the communication unit 207 is provided with an antenna. The bus 208 transmits the information by connecting the respective units of the image processing apparatus 1 to each other.

It should be noted that, according to the present embodiment, the display unit 205 and the operation unit 206 exist inside the image processing apparatus 1, but a configuration may also be adopted in which the image processing apparatus 1 is not provided with at least one of the display unit 205 and the operation unit 206. In addition, at least one of the display unit 205 and the operation unit 206 may exist outside the image processing apparatus 1 as another apparatus, and the CPU 201 may operate as a display control unit that controls the display unit 205 and an operation control unit that controls the operation unit 206.

Operation Flow

Figure 3:
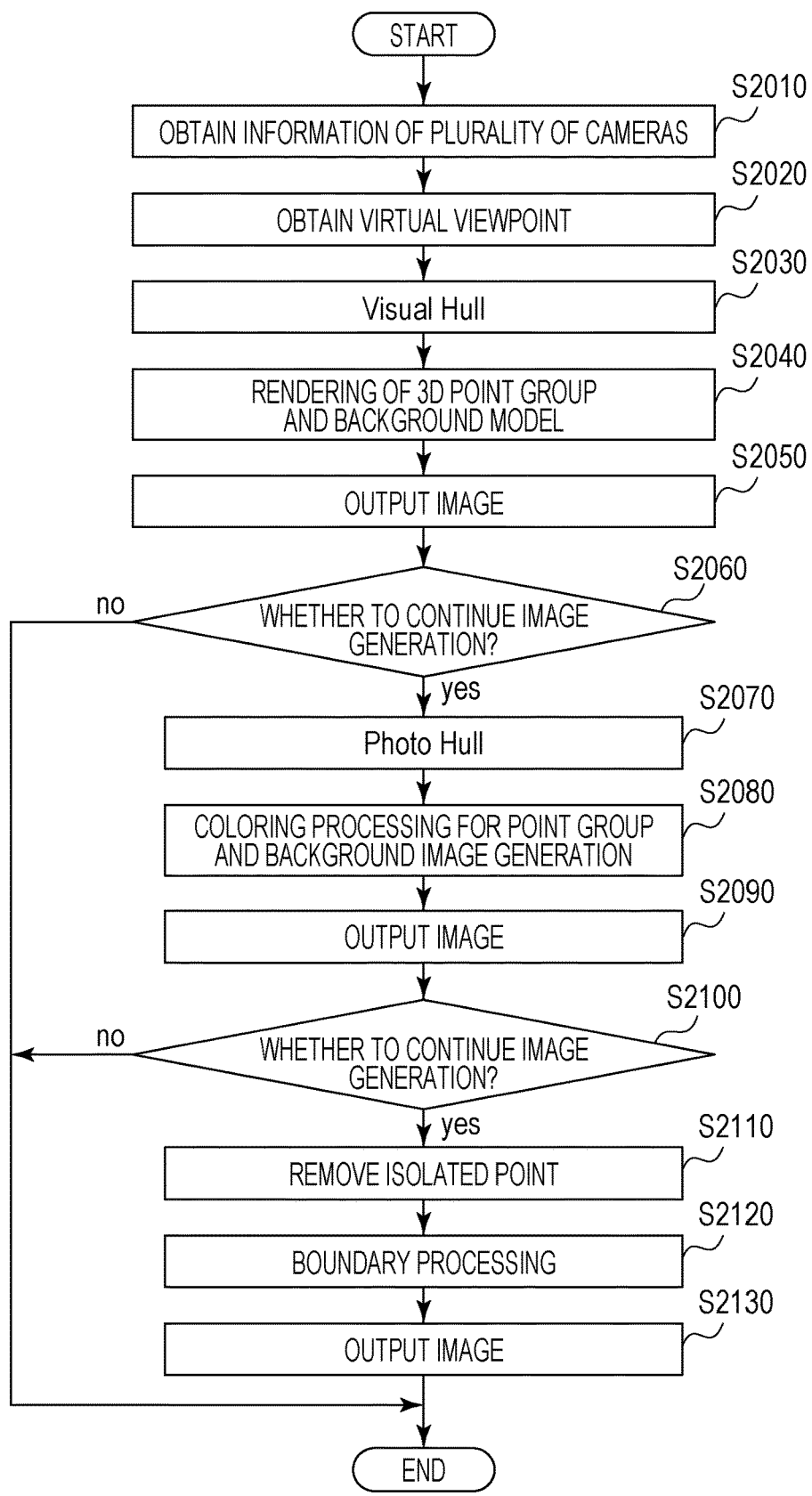
FIG. 3 is a flow chart for describing one mode of an operation of the image processing apparatus 1.

Next, one mode of an operation of the image processing apparatus 1 will be described by using FIG. 3. The processing illustrated in FIG. 3 is started when the viewpoint obtaining unit 110 performs the acceptance of the generation instruction of the virtual viewpoint image and is repeated periodically (for example, every frame in a case where the virtual viewpoint image is a moving image). It should be noted however that the starting timing of the processing illustrated in FIG. 3 is not limited to the above-described timing. The processing illustrated in FIG. 3 is realized when the CPU 201 expands the programs stored in the ROM 202 into the RAM 203 to be executed. It should be noted that at least part of the processing illustrated in FIG. 3 may be realized by dedicated-use hardware different from the CPU 201.

In the flow illustrated in FIG. 3, S2010 and S2020 correspond to processing for obtaining the information, and S2030 to S2050 correspond to processing for generating and outputting the virtual viewpoint image (specification image) for the operator to specify the virtual viewpoint. In addition, S2070 to S2100 correspond to processing for generating and outputting the live image. S2110 to S2130 correspond to processing for generating and outputting the non-live image. Hereinafter, details of the processes in the respective steps will be described.

In S2010, the camera information obtaining unit 100 obtains the captured images of the respective cameras based on the capturing by the camera group 2 and the external parameters and the internal parameters of the respective cameras. The external parameter is information with regard to a position and an orientation of the camera, and the internal parameter is information with regard to a focal distance and an image center of the camera.

In S2020, the viewpoint obtaining unit 110 obtains the virtual viewpoint information as the information in accordance with the specification of the virtual viewpoint by the operator. According to the present embodiment, the virtual viewpoint information corresponds to an external parameter and an internal parameter of a virtual camera that captures the subject from the virtual viewpoint, and one piece of virtual viewpoint information is needed to generate one frame of the virtual viewpoint image.

In S2030, the image generation unit 120 estimates a three-dimensional shape of an object corresponding to the subject on the basis of the captured images by the camera group 2. The object corresponding to the subject is, for example, a person, a moving object, or the like that exists in a capturing range of the camera group 2. The image generation unit 120 calculates differences between the captured images obtained from the camera group 2 and previously obtained background images corresponding to the respective cameras to generate silhouette images in which a part (foreground area) corresponding to the object in the captured image is extracted. The image generation unit 120 then uses the silhouette images corresponding to the respective cameras and the parameters of the respective cameras to estimate the three-dimensional shape of the object. For example, a Visual Hull technique is used for the estimation of the three-dimensional shape. As a result of this processing, a 3D point group (set of points having three-dimensional coordinates) that represents the three-dimensional shape of the object corresponding to the subject is obtained. It should be noted that the method of deriving the three-dimensional shape of the object from the captured images by the camera group 2 is not limited to this.

In S2040, the image generation unit 120 performs rendering of the 3D point group and a background 3D model on the basis of the obtained virtual viewpoint information and generates the virtual viewpoint image. The background 3D model is, for example, a CG model such as a racing ground where the camera group 2 is installed and is previously created to be saved in the image processing system 10. In the virtual viewpoint image generated by the processing thus far, the area corresponding to the object and the background area are respective displayed in predetermined colors (for example, a single color). It should be noted that the processing for performing the rendering of the 3D point group and the background 3D model is already known in the field of gaming and cinema and a method of promptly performing the processing is known such as, for example, a method of performing the processing by using the GPU. For this reason, the virtual viewpoint image generated in the processing up to S2040 can be promptly generated in accordance with the capturing by the camera group 2 and the specification of the virtual viewpoint by the operator.

Figure 4:
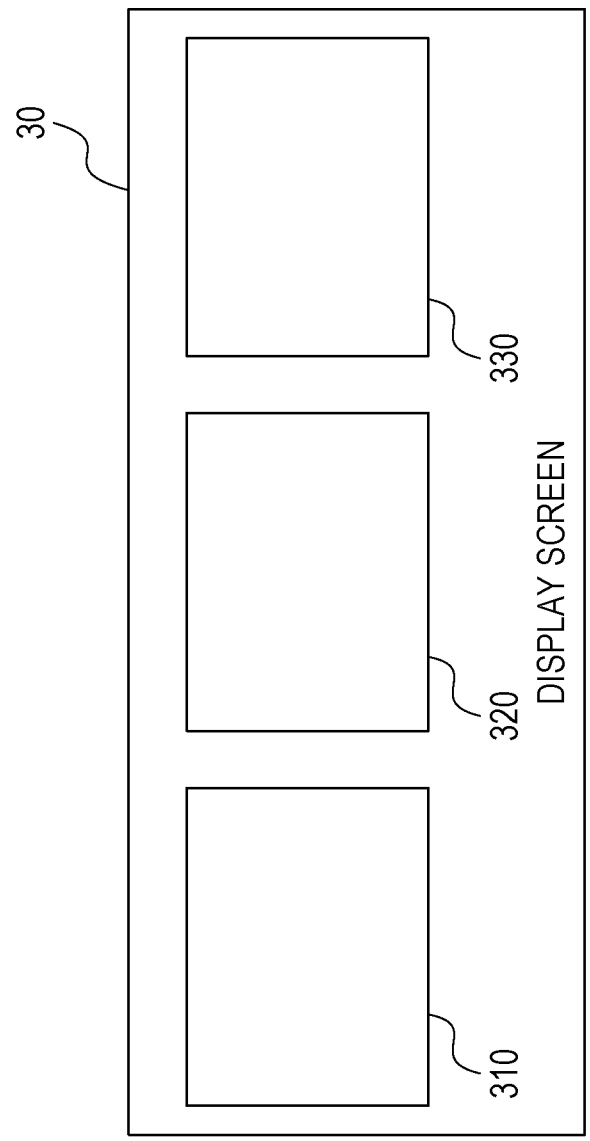
FIG. 4 is an explanatory diagram for describing a configuration of a display screen by a display apparatus 3.

In S2050, the output unit 130 outputs the virtual viewpoint image generated in S2040 by the image generation unit 120 to the display apparatus 3 for the operator to specify the virtual viewpoint. Here, a screen configuration of a display screen 30 of the display apparatus 3 will be described by using FIG. 4. The display screen 30 is constituted by an area 310, an area 320, and an area 330. For example, the virtual viewpoint image generated as the specification image is displayed in the area 310, the virtual viewpoint image generated as the live image is displayed in the area 320, and the virtual viewpoint image generated as the non-live image is displayed in the area 330. That is, the virtual viewpoint image generated in S2040 and output in S2050 is displayed in the area 310. The operator then performs the specification of the virtual viewpoint while observing the screen of the area 310. It should be noted that it is sufficient when the display apparatus 3 displays at least the specification image and does not necessarily need to display the live image and the non-live image.

In S2060, the image generation unit 120 determines whether or not the processing for generating the virtual viewpoint image having the higher image quality than the virtual viewpoint image generated in S2040 is performed. For example, in a case where only the image having the low image quality for specifying the virtual viewpoint is needed, the flow does not proceed to S2070, and the processing is ended. On the other hand, in a case where the image having the higher image quality is needed, the flow proceeds to S2070, and the processing continues.

In S2070, the image generation unit 120 further increases the accuracy of the shape model of the object (3D point group) which is estimated in S2030 by using a Photo Hull technique, for example. Specifically, by projecting the respective points of the 3D point group onto the captured images of the respective cameras and evaluating color matching rates in the respective captured images, it is determined whether or not the point is a point necessary to represent the subject shape. For example, with regard to a certain point in the 3D point group, a variance of a pixel value at a projection destination is higher than a threshold, it is determined that the point is not correct as the point representing the subject shape, and the point is deleted from the 3D point group. This processing is performed with respect to all of the points in the 3D point group to realize the increase in the accuracy of the shape model of the object. It should be noted that the method of increasing the accuracy of the shape model of the object is not limited to this.

In S2080, the image generation unit 120 executes processing for coloring the 3D point group in which the accuracy is increased in S2070 and projecting it onto the coordinates of the virtual viewpoint to generate a foreground image corresponding to the foreground area and processing for generating a background image as viewed from the virtual viewpoint. The image generation unit 120 then overlaps the foreground image onto the generated background image to generate the virtual viewpoint image as the live image.

Herein, an example of the method of generating the foreground image (image of the area corresponding to the object) of the virtual viewpoint image will be described. The processing for coloring the 3D point group is executed to generate the foreground image. The coloring processing is constituted by visibility determination of the point and calculation processing of the color. In the visibility determination, it is possible to identify the cameras that can perform the capturing with regard to the respective points from positional relationships between the respective points in the 3D point group and the plurality of cameras included in the camera group 2. Next, with regard to the respective points, a point is projected onto the captured image of the camera that can capture the point, and a color of a pixel at the projection destination is set as the color of the point. In a case where a certain point is captured by a plurality of cameras, the point is projected onto the captured images of the plurality of cameras, and pixel values at the projection destination are obtained, so that the color of the point is decided by calculating an average of the pixel values. When the rendering of the thus colored 3D point group is performed by a related-art CG rendering technology, it is possible to generate the foreground image of the virtual viewpoint image.

Next, an example of the method of generating the background image of the virtual viewpoint image will be described. First, apices of the background 3D model (for example, points corresponding to edges of the racing ground) are set. Then, these apices are projected onto coordinate systems of two cameras (set as a first camera and a second camera) close to the virtual viewpoint and a coordinate system of the virtual viewpoint. In addition, a first projection matrix between the virtual viewpoint and the first camera and a second projection matrix between the virtual viewpoint and the second camera are calculated by using corresponding points of the virtual viewpoint and the first camera and corresponding points of the virtual viewpoint and the second camera. Then, the captured image of the first camera and the captured image of the second camera are projected onto the respective pixels of the background image by using the first projection matrix and the second projection matrix, and the average of the pixel values at the projection destination is calculated, so that the pixel values of the background image are decided. It should be noted that the pixel values of the background image may be decided from the captured images of three or more cameras by a similar method.

The colored virtual viewpoint image can be generated by overlapping the foreground image on the thus obtained background image of the virtual viewpoint image. That is, the virtual viewpoint image generated in S2080 has the higher image quality than the virtual viewpoint image generated in S2040 with regard to the number of gradations of the colors. Conversely, the number of gradations of the colors included in the virtual viewpoint image generated in S2040 is lower than the number of gradations of the colors included in the virtual viewpoint image generated in S2080. It should be noted that the method of adding the color information to the virtual viewpoint image is not limited to this.

In S2090, the output unit 130 outputs the virtual viewpoint image generated in S2080 by the image generation unit 120 to the display apparatus 3 and the display apparatus 4 as the live image. The image output to the display apparatus 3 is displayed in the area 320 and can be observed by the operator, and the image output to the display apparatus 4 can be observed by the viewer.

In S2100, the image generation unit 120 determines whether or not the processing for generating the virtual viewpoint image having the higher image quality than the virtual viewpoint image generated in S2080 is performed. For example, in a case where the virtual viewpoint image is only provided to be broadcast live with respect to the viewer, the flow does not proceed to S2110, and the processing is ended. On the other hand, in a case where the image having the higher image quality is to be broadcast towards the viewer after recording, the flow proceeds to S2110, and the processing continues.

In S2110, the image generation unit 120 further increases the accuracy of the shape model of the object generated in S2070. According to the present embodiment, the increase in the accuracy is realized by deleting an isolated point of the shape model. In the isolated point removal, first, with regard to a voxel set (3D point group) calculated by Photo Hull, whether or not another voxel exists in the surrounding of the respective voxels is investigated. In a case where the voxel does not exist in the surrounding, it is determined that the voxel is the isolated point, and the voxel is deleted from the voxel set. When the processing similar to S2080 is executed by using the shape model from which the isolated point is thus deleted, the virtual viewpoint image is generated in which the higher accuracy of the shape of the object is obtained than the virtual viewpoint image generated in S2080.

In S2120, the image generation unit 120 applies smoothing processing to a boundary between the foreground area of the virtual viewpoint image generated in S2110 and the background area and corrects the image such that a boundary area is smoothly displayed.

In S2130, the output unit 130 outputs the virtual viewpoint image generated by the image generation unit 120 in S2120 to the display apparatus 3 and the display apparatus 4 as the non-live image. The non-live image output to the display apparatus 3 is displayed in the area 330.

By the above-described processing, the image processing apparatus 1 generates the virtual viewpoint image as the specification image for the operator to specify the virtual viewpoint and the live image corresponding to the virtual viewpoint image having the higher image quality than the specification image which is to be displayed with respect to the viewer on the basis of one set of the captured images and the virtual viewpoint information. Herein, the live image is generated on the basis of the specification of the virtual viewpoint by the operator. Specifically, the live image is the virtual viewpoint image corresponding to the virtual viewpoint decided in accordance with the specification operation by the operator with respect to the specification image. In addition, the image processing apparatus 1 also generates the non-live image corresponding to the virtual viewpoint image having the higher image quality than the live image. The image processing apparatus 1 then outputs the generated live image and non-live image to the display apparatus 4 such that the live image is displayed before the non-live image is displayed. The image processing apparatus 1 also outputs the generated specification image to the display apparatus 3 such that the specification image is displayed on the display apparatus 3 before the live image is displayed the display apparatus 4.

According to this, the display apparatus 4 can display the specification image having the low image quality, the live image to be broadcast live which has the higher image quality than the specification image, and the non-live image to be broadcast after recording which has the even higher image quality than the live image. It should be noted that the display apparatus 4 may also display only one of the live image and the non-live image, and in above-described case, the image processing apparatus 1 outputs the virtual viewpoint image suitable to the display apparatus 4. In addition, the display apparatus 3 can display the three types of the virtual viewpoint images including the virtual viewpoint image having the low image quality as the specification image, the virtual viewpoint image having the medium image quality as the live image, and the virtual viewpoint image having the high image quality as the non-live image. It should be noted that it is also sufficient when the display apparatus 3 does not display at least any one of the live image and the non-live image.

That is, the image processing apparatus 1 outputs the specification image to the display apparatus 3 for the user to specify the virtual viewpoint. The image processing apparatus 1 then outputs at least any one of the live image and the non-live image that have the higher image quality than the specification image to the display apparatus 4 for displaying the virtual viewpoint image generated on the basis of the specification of the virtual viewpoint by the user. According to this, it is possible to respond to both the requirements of the operator who desires to display the virtual viewpoint image with low delay for specifying the virtual viewpoint and the viewer who desires to observe the virtual viewpoint image having the high image quality.

It should be noted that, in the above-described processing, the virtual viewpoint image is generated on the basis of the images based on the capturing by the camera group 2 and the information in accordance with the specification of the virtual viewpoint, and the virtual viewpoint image having the high image quality is generated on the basis of the result of the processing for the generation. For this reason, the overall processing amount can be decreased as compared with a case where the virtual viewpoint image having the low image quality and the virtual viewpoint image having the high image quality are respectively generated by independent processes. It should be noted however that the virtual viewpoint image having the low image quality and the virtual viewpoint image having the high image quality may also be generated by independent processes. In addition, in a case where the virtual viewpoint image is displayed on a display installed in a competition venue or a concert venue or broadcast live corresponding to a case where the image does not need to be broadcast after recording, the image processing apparatus 1 does not perform the processing for generating the non-live image. According to this, it is possible to reduce the processing amount for generating the non-live image having the high image quality.

In addition, the image processing apparatus 1 may generate a replay image to be displayed after capturing instead of the live image to be broadcast live or in addition to the live image. For example, the replay image is displayed on the display in the competition venue during halftime or after the end of the match in a case where the target of the capturing by the camera group 2 is a match such as soccer in the competition venue. The replay image has a higher image quality than the specification image and is also generated at such an image quality that the generation can be completed until the end of the match or halftime to be displayed.

Next, another mode of the operation of the image processing apparatus 1 will be described by using FIG. 5. According to the operation mode described above by using FIG. 3, the virtual viewpoint image having the high image quality is generated by additionally performing processing of a new type after the virtual viewpoint image having the low image quality is generated. On the other hand, in the operation mode which will be described below by using FIG. 5, the increase in the image quality of the virtual viewpoint image is realized by increasing the number of cameras used for generating the virtual viewpoint image. In the following explanation, the descriptions of the part similar to the processing in FIG. 3 will be omitted.

Figure 5:
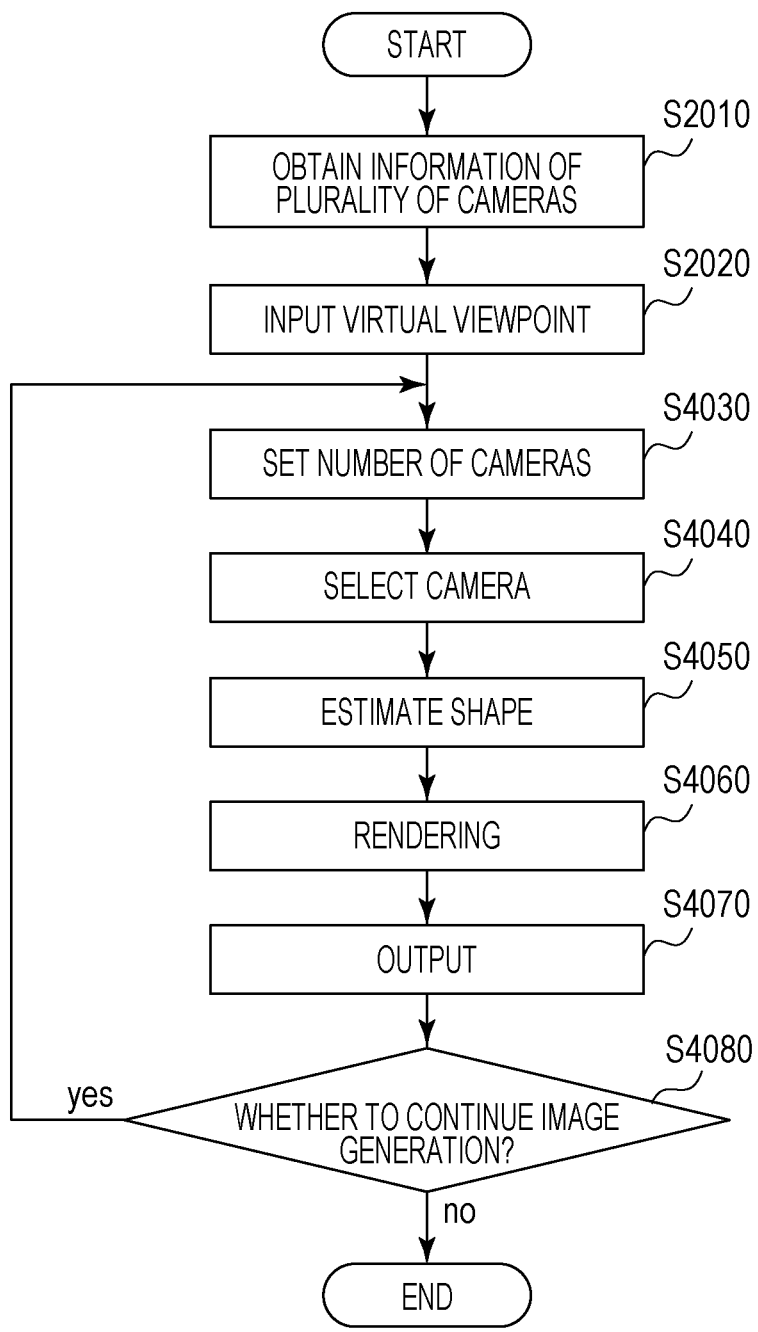
FIG. 5 is a flow chart for describing one mode of the operation of the image processing apparatus 1.

The processing illustrated in FIG. 5 is started at a timing when the viewpoint obtaining unit 110 performs the acceptance of the generation instruction of the virtual viewpoint image. It should be noted however that the starting timing of the processing of FIG. 5 is not limited to this. In S2010 and S2020, the image processing apparatus 1 obtains the captured images by the respective cameras of the camera group 2 and the virtual viewpoint information by the processing similar to that described in FIG. 3.

In S4030, the image generation unit 120 sets the number of cameras corresponding to the captured images used for the generation of the virtual viewpoint image. Herein, the image generation unit 120 sets the number of cameras such that the processing in S4050 to S4070 is completed in a processing time shorter than or equal to a predetermined threshold (for example, a time corresponding to one frame in a case where the virtual viewpoint image is a moving image). For example, it is supposed that the processing in S4050 to S4070 is executed by using the captured images of 100 cameras in advance, and the processing time is 0.5 seconds. In this case, when the processing in S4050 to S4070 is desired to be completed in 0.016 seconds corresponding to one frame of the virtual viewpoint image in which the frame rate is 60 fps (frame per second), the number of cameras is set as 3.

It should be noted that, in a case where the continuation of the image generation is determined in S4080 after the virtual viewpoint image is output by the processing in S4050 to S4070, the flow returns to S4030, and the number of used cameras is set again. Herein, a permissible processing time is lengthened such that the virtual viewpoint image having the higher image quality than the previously output virtual viewpoint image is to be generated, and the number of cameras is increased according to it. For example, the number of cameras corresponding to the captured images to be used is set as 20 such that the processing in S4050 to S4070 is to be completed in a processing time shorter than or equal to 0.1 seconds.

In S4040, the image generation unit 120 selects the cameras corresponding to the captured images to be used from the camera group 2 in accordance with the number of cameras set in S4030 to generate the virtual viewpoint image. For example, in a case where 3 cameras are selected from among 100 cameras, the camera closest to the virtual viewpoint and the 34th camera and the 67th camera counted from the camera are selected.

In addition, after the virtual viewpoint image is generated once, in a case where the processing is performed in the second time by increasing the number of captured images to be used, since the accuracy of the shape model estimated in the processing in the first time is further increased, a camera other than the camera selected in the first processing is selected. Specifically, in a case where 20 cameras are selected from among 100 cameras, the camera closest to the virtual viewpoint is selected first from among the cameras that are not selected in the first processing, and the camera is selected at intervals of every five cameras. At this time, the camera already selected in the first processing is skipped, and the next camera is selected. It should be noted that, for example, in a case where the virtual viewpoint image having the highest image quality as the non-live image is generated, all the cameras included in the camera group 2 are selected, and the processing in S4050 to S4070 is executed by using the captured images of the respective cameras.

It should be noted that a method of selecting the cameras corresponding to the captured images to be used is not limited to this. For example, the camera close to the virtual viewpoint may be prioritized to be selected. In this case, the accuracy of the shape estimation of the back area that is not seen from the virtual viewpoint in the shape estimation of the object corresponding to the subject is decreased, but the accuracy of the shape estimation of the front side area that is seen from the virtual viewpoint is improved. That is, the image quality in the area easily observed by the viewer in the virtual viewpoint image can be preferentially improved.

In S4050, the image generation unit 120 executes the object shape estimation processing by using the captured image by the camera which is selected in S4040. The processing here is, for example, a combination of the processing in S2030 in FIG. 3 (Visual Hull) and the processing in S2070 (Photo Hull). The processing of Visual Hull includes processing for calculating a logical product of visual volumes of the plurality of cameras corresponding to the plurality of captured images to be used. In addition, the processing of Photo Hull includes processing for projecting the respective points of the shape model onto the plurality of captured images and calculating consistency of the pixel values. For this reason, as the number of cameras corresponding to the captured images to be used is lower, the accuracy of the shape estimation is decreased, and the processing time is shortened.

In S4060, the image generation unit 120 executes the rendering processing. The processing herein is similar to the processing in S2080 in FIG. 3 and includes the coloring processing for the 3D point group and the generation processing for the background image. The coloring processing for the 3D point group and the generation processing for the background image both include the processing for deciding the color by the calculating using the pixel values of the points corresponding to the plurality of captured images. For this reason, as the number of cameras corresponding to the captured images to be used is lower, the accuracy of the rendering is decreased, and the processing time is shortened.

In S4070, the output unit 130 outputs the virtual viewpoint image generated by the image generation unit 120 in S4060 to the display apparatus 3 or the display apparatus 4.

In S4080, the image generation unit 120 determines whether or not the processing for generating the virtual viewpoint image having the higher image quality than the virtual viewpoint image generated in S4060 is performed. For example, in a case where the virtual viewpoint image generated in S4060 is the image for the operator to specify the virtual viewpoint and the live image is to be further generated, the flow returns to S4030, and the virtual viewpoint image as the live image is generated by increasing the number of used cameras. In addition, in a case where the non-live image is further generated after the live image is generated, and the virtual viewpoint image as the non-live image is generated by further increasing the number of cameras. That is, since the number of cameras corresponding to the captured images used for the generation of the virtual viewpoint image as the live image is higher than the number of cameras corresponding to the captured images used for the generation of the virtual viewpoint image as the specification image, the live image has the higher image quality than the specification image. Similarly, since the number of cameras corresponding to the captured images used for the generation of the virtual viewpoint image as the non-live image is higher than the number of cameras corresponding to the captured images used for the generation of the virtual viewpoint image as the live image, the non-live image has the higher image quality than the live image.

It should be noted that, in S4080, in a case where it is determined that the virtual viewpoint image having the higher image quality than the already generated virtual viewpoint image does not need to be generated or a case where it is determined that the virtual viewpoint image having the higher image quality cannot be generated, the processing is ended.

By the above-described processing, the image processing apparatus 1 can generate the plurality of virtual viewpoint images in which the image quality is improved stepwise at respectively appropriate timings to be output. For example, it is possible to generate the specification image with little delay by restricting the number of cameras to be used for the generation of the virtual viewpoint image to such a number that the generation processing can be completed in the set processing time. In addition, in a case where the live image and the non-live image are to be generated, it is possible to generate the higher image quality images when the generation processing is performed by increasing the number of used cameras.

Next, another mode of the operation of the image processing apparatus 1 will be described by using FIG. 6. According to the operation mode described above by using FIG. 5, when the number of cameras used for generating the virtual viewpoint image is increased, the increase in the image quality of the virtual viewpoint image is realized. On the other hand, according to the operation mode which will be described below by using FIG. 6, the increase in the image quality of the virtual viewpoint image is realized by increasing a resolution of the virtual viewpoint image stepwise. In the following explanation, the descriptions of the part similar to the processing in FIG. 3 or FIG. 5 will be omitted. It should be noted that, according to the operation mode which will be described below, the number of pixels of the virtual viewpoint image to be generated is regularly set as 4K (3840×2160), and the resolution of the virtual viewpoint image is controlled depending on whether the calculation for the pixel value is performed for each large pixel block or each small pixel block. It should be noted however that the configuration is not limited to this, and the resolution may be controlled by changing the number of pixels of the virtual viewpoint image to be generated.

Figure 6:
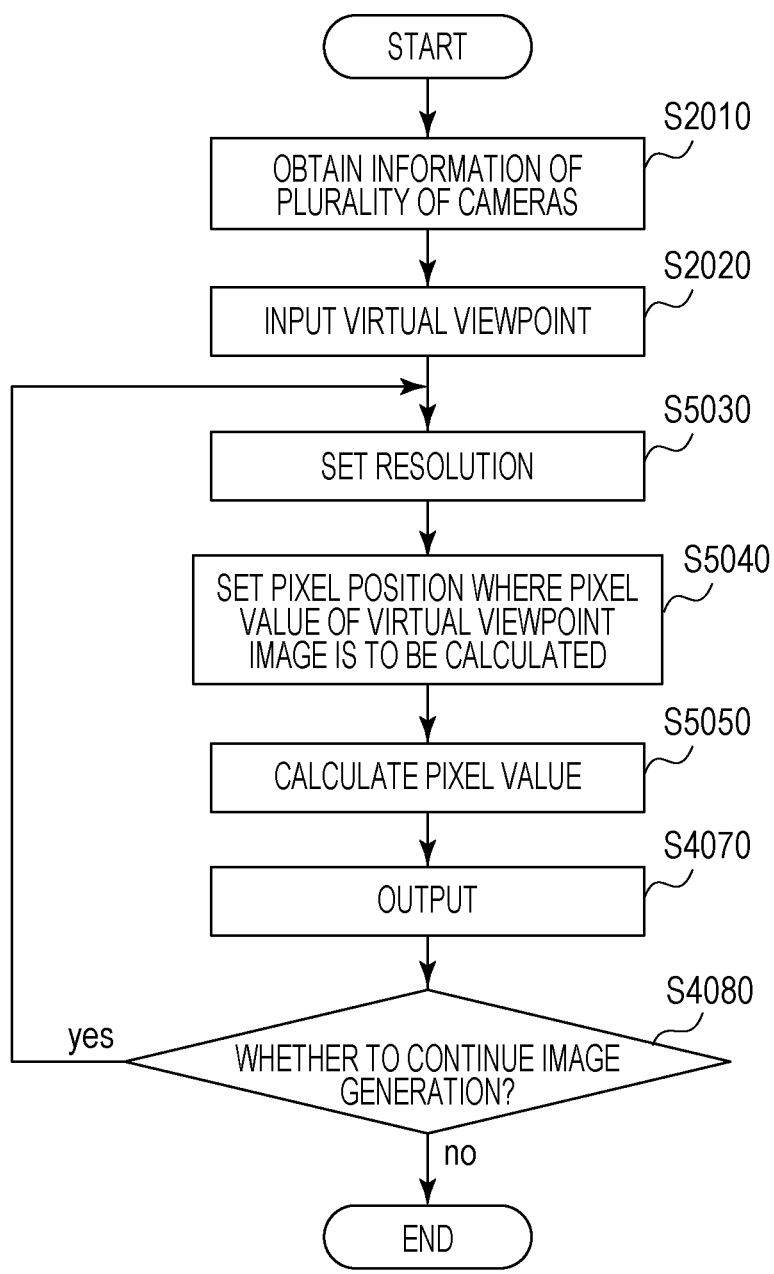
FIG. 6 is a flow chart for describing one mode of the operation of the image processing apparatus 1.

The processing illustrated in FIG. 6 is started at a timing when the viewpoint obtaining unit 110 performs the acceptance of the generation instruction of the virtual viewpoint image. It should be noted however that the starting timing of the processing of FIG. 6 is not limited to this. In S2010 and S2020, the image processing apparatus 1 obtains the captured images by the respective cameras of the camera group 2 and the virtual viewpoint information by the processing similar to that described in FIG. 3.

In S5030, the image generation unit 120 sets a resolution of the virtual viewpoint image to be generated. Herein, the image generation unit 120 sets such a resolution that the processing in S5050 and S4070 is completed in the processing time shorter than or equal to a predetermined threshold. For example, it is supposed that the processing in S5050 and S4070 in a case where the virtual viewpoint image having the 4K resolution is previously generated is executed and the processing time is set as 0.5 seconds. In this case, when the processing in S5050 and S4070 is desired to be completed in 0.016 seconds corresponding to one frame of the virtual viewpoint image in which the frame rate is 60 fps, the resolution needs to be 0.016/0.5=1/31.25 times that of 4K or lower. In view of the above, when the vertical and horizontal resolutions of the virtual viewpoint image are respectively set to be ⅛ times the 4K resolution, the number of pixel blocks the pixel value is to be calculated becomes 1/64, and the processing can be completed in less than 0.016 seconds.

It should be noted that, in a case where it is determined in S4080 that the image generation is continued after the virtual viewpoint image is output by the processing in S5050 and S4070, the flow returns to S5030, and the resolution is set again. Herein, the permissible processing time is lengthened such that the virtual viewpoint image having the higher image quality than the previously output virtual viewpoint image is generated, and the resolution is increased in accordance with it. For example, when the vertical and horizontal resolutions are respectively set to be ¼ of the 4K resolution, the processing in S5050 and S4070 can be completed in the processing time shorter than or equal to 0.1 seconds. In S5040, the image generation unit 120 decides the position of the pixel where the pixel value is to be calculated in the virtual viewpoint image in accordance with the resolution set in S5030. For example, in a case where the resolution of the virtual viewpoint image is set to be ⅛ of the 4K resolution, the pixel values are respectively calculated for every eight pixels vertically and horizontally. Then, the same pixel value as the pixel (x, y) is set for the pixels existing between the pixel (x, y) and the pixel (x+8, y+8) where the pixel value is calculated.

In addition, after the virtual viewpoint image is generated once, in a case where the processing in the second time is performed by increasing the resolution, the pixel value is calculated by skipping the pixel where the pixel value is calculated in the first time. For example, in a case where the resolution is set to be ¼ of the 4K resolution, the pixel value of the pixel (x+4, y+4) is calculated, and the same pixel value as the pixel (x+4, y+4) is set for the pixels existing between the pixel (x+4, y+4) and the pixel (x+8, y+8). In this manner, when the number of pixels where the pixel value is calculated is increased, the resolution of the virtual viewpoint image can be increased up to the 4K resolution at maximum.

In S5050, the image generation unit 120 performs the coloring processing for the virtual viewpoint image by calculating the pixel value of the pixel in the position decided in S5040. As a calculation method for the pixel value, for example, a method of Image-Based Visual Hull can be used. Since the pixel value is calculated for each pixel according to this method, as the number of pixels where the pixel value is to be calculated is lower, that is, as the resolution of the virtual viewpoint image is lower, the processing time is shortened.

In S4070, the output unit 130 outputs the virtual viewpoint image generated by the image generation unit 120 in S5050 to the display apparatus 3 or the display apparatus 4.

In S4080, the image generation unit 120 determines whether or not the processing for generating the virtual viewpoint image having the higher image quality than the virtual viewpoint image generated in S5050 is performed. For example, in a case where the virtual viewpoint image generated in S5050 is the image for the operator to specify the virtual viewpoint and the live image is to be further generated, the flow returns to S5030, and the virtual viewpoint image having the increased resolution is generated. In addition, after the live image is generated and the non-live image is to be further generated, the virtual viewpoint image as the non-live image in which the resolution is further increased is generated. That is, since the virtual viewpoint image as the live image has the higher resolution than the virtual viewpoint image as the specification image, the live image has the higher image quality than the specification image. Similarly, since the virtual viewpoint image as the non-live image has the higher resolution than the virtual viewpoint image as the live image, the non-live image has the higher image quality than the live image.

It should be noted that, in S4080, in a case where it is determined that the virtual viewpoint image having the higher image quality than the already generated virtual viewpoint image does not need to be generated or a case where it is determined that the virtual viewpoint image having the higher image quality cannot be generated, the processing is ended.

By the above-described processing, the image processing apparatus 1 can generate the plurality of virtual viewpoint images in which the resolution is improved stepwise at respectively appropriate timings to be output. For example, it is possible to generate the specification image with little delay by setting the resolution of the virtual viewpoint image such a resolution that the generation processing can be completed in the set processing time. In addition, in a case where the live image and the non-live image are to be generated, it is possible to generate the higher image quality images when the generation processing is performed by increasing the resolution.

As described above, the image processing apparatus 1 performs the image processing for improving the image quality of the virtual viewpoint image to generate the image having the high image quality (for example, the non-live image). The image processing apparatus 1 also generates the image having the low image quality (for example, the live image) by the processing executed in the processing time shorter than or equal to the predetermined threshold corresponding to partial processing included in the image processing. According to this, both the virtual viewpoint image to be displayed with the delay shorter than or equal to the predetermined time and the virtual viewpoint image having the high image quality can be generated and displayed.

It should be noted that, in the explanation of FIG. 6, it is assumed that the generation parameter (resolution) for completing the generation processing in the processing time shorter than or equal to the predetermined threshold is estimated, and the virtual viewpoint image is generated by the estimated generation parameter. It should be noted however that the configuration is not limited to this, and the image processing apparatus 1 may improve the image quality of the virtual viewpoint image stepwise and output the already generated virtual viewpoint image at a time point when the processing time reaches a predetermined threshold. For example, in a case where the virtual viewpoint image in which the resolution is ⅛ of the 4K resolution is already generated and the virtual viewpoint image in which the resolution is ¼ of the 4K resolution is not completed at the time point when the processing time reaches the predetermined threshold, the virtual viewpoint image in which the resolution is ⅛ may be output. In addition, the virtual viewpoint image in which the processing for improving the resolution from the ⅛ resolution to the ¼ resolution is performed in midcourse may be output.

According to the present embodiment, the case has been mainly described where the image generation unit 120 included in the image processing apparatus 1 controls the generation of the virtual viewpoint image on the basis of the image obtained by the camera information obtaining unit 100 and the virtual viewpoint information obtained by the viewpoint obtaining unit 110 and generates the plurality of virtual viewpoint images having the different image qualities. It should be noted however that the configuration is not limited to this, and the function for controlling the generation of the virtual viewpoint image and the function for actually generating the virtual viewpoint image may be included in respectively different apparatuses.

For example, a generation apparatus (not illustrated) that has a function of the image generation unit 120 and generates the virtual viewpoint image may also exist in the image processing system 10. Then, the image processing apparatus 1 may control the generation of the virtual viewpoint image by the generation apparatus on the basis of the image obtained by the camera information obtaining unit 100 and the information obtained by the viewpoint obtaining unit 110. Specifically, the image processing apparatus 1 transmits the captured images and the virtual viewpoint information to the generation apparatus and performs the instruction for controlling the generation of the virtual viewpoint image. The generation apparatus then generates a first virtual viewpoint image and a second virtual viewpoint image that is to be displayed at a timing earlier than the display of the first virtual viewpoint image, the second virtual viewpoint image having the lower image quality than the first virtual viewpoint image, on the basis of the received captured images and the virtual viewpoint information. Herein, the first virtual viewpoint image is, for example, the non-live image, and the second virtual viewpoint image is, for example, the live image. It should be noted however that the use purpose for the first virtual viewpoint image and the second virtual viewpoint image is not limited to this. It should be noted that the image processing apparatus 1 may perform the control such that the first virtual viewpoint image and the second virtual viewpoint image are generated by the respectively different generation apparatuses. In addition, the image processing apparatus 1 may perform output control for controlling the output destination of the virtual viewpoint image by the generation apparatus and the output timing and the like.

In addition, the generation apparatus may include the functions of the viewpoint obtaining unit 110 and the image generation unit 120, and the image processing apparatus 1 may control the generation of the virtual viewpoint image by the generation apparatus on the basis of the images obtained by the camera information obtaining unit 100. Herein, the images obtained by the camera information obtaining unit 100 are images based on the capturing such as the captured images captured by the camera group 2 and the images generated on the basis of basis of the difference between the plurality of captured images. In addition, the generation apparatus may include the functions of the camera information obtaining unit 100 and the image generation unit 120, and the image processing apparatus 1 may control the generation of the virtual viewpoint image by the generation apparatus on the basis of the images obtained by the viewpoint obtaining unit 110. Herein, the images obtained by the viewpoint obtaining unit 110 are the information in accordance with the specification of the virtual viewpoint such as the information indicating the contents determined in accordance with the virtual view point such as the shape or the orientation of the subject in the virtual viewpoint image and the virtual viewpoint information. That is, the image processing apparatus 1 may obtain the information related to the generation of the virtual viewpoint image including at least one of the images based on the capturing and the information in accordance with the specification of the virtual viewpoint and control the generation of the virtual viewpoint image on the basis of the obtained information.

In addition, for example, the generation apparatus that exists in the image processing system 10 may include the functions of the camera information obtaining unit 100, the viewpoint obtaining unit 110, and the image generation unit 120, and the image processing apparatus 1 may control the generation of the virtual viewpoint image by the generation apparatus on the basis of on the basis of the information related to the generation of the virtual viewpoint image. The information related to the generation of the virtual viewpoint image in this case includes, for example, at least any one of parameters with regard to the image quality of the first virtual viewpoint image and parameters with regard to the image quality of the second virtual viewpoint image which are generated by the generation apparatus. Specific examples of the parameters with regard to the image quality include the number of cameras corresponding to the captured images used for the generation of the virtual viewpoint image, the resolution of the virtual viewpoint image, a permissible time as the processing time related to the generation of the virtual viewpoint image, and the like. The image processing apparatus 1 obtains these parameters with regard to the image quality on the basis of on the basis of the input by the operator, for example, and controls the generation apparatus on the basis of the obtained parameters by transmitting the parameters to the generation apparatus or the like. According to this, the operator can generate the plurality of virtual viewpoint images having the mutually different desired image qualities.

As described above, the image processing apparatus 1 accepts the generation instruction of the virtual viewpoint image based on the images based on the capturing of the subject from the respectively different directions by the plurality of cameras and the information in accordance with the specification of the virtual viewpoint. The image processing apparatus 1 then performs the control in accordance with the acceptance of the generation instruction such that the first virtual viewpoint image to be output to a first display apparatus and the second virtual viewpoint image to be output to a second display apparatus are generated on the basis of the images based on the capturing and the information in accordance with the specification of the virtual viewpoint. Herein, the second virtual viewpoint image is a virtual viewpoint image having the higher image quality than the first virtual viewpoint image. According to this, for example, also in a case where both the user who desires to observe the virtual viewpoint image in real time and the user who prioritizes the high image quality of the virtual viewpoint image over the real-time property exist, it is possible to generate the virtual viewpoint image suitable to the timing when the display is to be performed.

It should be noted that, according to the present embodiment, the case has been described where the color gradation, the resolution, and the number of cameras corresponding to the captured images used for the generation of the virtual viewpoint image are controlled as the image quality of the virtual viewpoint image, but other parameters may be controlled as the image quality. In addition, a plurality of parameters with regard to the image quality may be controlled at the same time.

The present invention can also be realized by processing in which a program that realizes one or more functions of the above-described embodiments is supplied to a system or an apparatus via a network or a storage medium, and one or more processors in a computer of the system or the apparatus reads out and executes the program. In addition, the present invention can be realized by a circuit (for example, an ASIC or the like) that realizes one or more functions. In addition, the program may be recorded in a computer-readable recording medium to be provided.

According to the present invention, it is possible to generate the virtual viewpoint image in accordance with the plurality of different requirements with regard to the image quality.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing system comprising:
one or more hardware processors; and
one or more memories which store instructions executable by the one or more hardware processors to cause the image processing system to perform at least:
obtaining images based on image capturing by a plurality of image capturing apparatuses at different positions;
receiving an input according to an operation for designating a virtual viewpoint;
generating a plurality of virtual viewpoint images, each of which is generated based on the obtained images and the received input,
wherein the plurality of generated virtual viewpoint images includes a first virtual viewpoint image to be output to a first apparatus that displays the first virtual viewpoint image for a first user designating a virtual viewpoint and a second virtual viewpoint image which (i) is an image generated based on the virtual viewpoint designated by the first user using the first virtual viewpoint image displayed on the first apparatus, (ii) is output to a second apparatus different from the first apparatus and that displays the second virtual image for the second user different from the first user and (iii) has a larger image data size per frame of a moving image than that of the first virtual viewpoint image.

2. The image processing system according to claim 1, wherein a time when the first virtual viewpoint image is output is earlier than a time when the second virtual viewpoint image is output.

3. The image processing system according to claim 1, wherein the second virtual viewpoint image is generated by performing further image processing using at least one of the first virtual viewpoint image and image data generated in a process for generating the first virtual viewpoint image from the obtained images.

4. The image processing system according to claim 1, wherein the second virtual viewpoint image is generated by performing first processing for increasing an image data size per frame of another virtual viewpoint image generated on a basis of the images based on the image capturing and the input according to the operation, and the first virtual viewpoint image is generated by performing second processing executed in a processing time shorter than or equal to a threshold, the second processing corresponding to partial processing included in the first processing.

5. The image processing system according to claim 1,
wherein the first virtual viewpoint image is an image representing a shape of an object captured by at least one of the plurality of image capturing apparatuses, and
wherein the second virtual viewpoint image is an image representing the shape of the object and also a color of the object which is not represented in the first virtual viewpoint image.

6. The image processing system according to claim 1, wherein the second virtual viewpoint image has a larger number of gradations of a color than that of the first virtual viewpoint image.

7. The image processing system according to claim 1, wherein the second virtual viewpoint image has a higher resolution than that of the first virtual viewpoint image.

8. The image processing system according to claim 1, wherein the plurality of generated virtual viewpoint images further includes a third virtual viewpoint image having a larger image data size per frame of a moving image than that of the second virtual viewpoint image.

9. The image processing system according to claim 8,
wherein the second virtual viewpoint image is an image to be broadcast live, and
wherein the third virtual viewpoint image is an image to be broadcast after recording.

10. The image processing system according to claim 1, wherein a number of image capturing apparatuses corresponding to images used for generating the second virtual viewpoint image is larger than a number of image capturing apparatuses corresponding to images used for generating the first virtual viewpoint image.

11. The image processing system according to claim 1, wherein the instructions further cause the image processing system to perform
outputting a parameter related to image quality of a virtual viewpoint image to to generate the first virtual viewpoint image and the second virtual viewpoint image based on the output parameter.

12. The image processing system according to claim 11, wherein the parameter related to the image quality of a virtual viewpoint image includes at least one of a number of image capturing apparatuses corresponding to images to be used for generating the virtual viewpoint image, a resolution of the virtual viewpoint image, and a permissible time as a processing time for generating the virtual viewpoint image.

13. The image processing system according to claim 1, wherein a processing amount of image processing to be executed for generating the second virtual viewpoint image from the obtained images is larger than a processing amount of image processing to be executed for generating the first virtual viewpoint image from the obtained images.

14. The image processing system according to claim 1, wherein the first virtual viewpoint image is not output to the second apparatus.

15. An image processing method comprising:
obtaining images based on image capturing by a plurality of image capturing apparatuses at different positions;
receiving an input according to an operation for designating a virtual viewpoint;
generating a plurality of virtual viewpoint images, each of which is generated based on a basis of the obtained images and the received input,
wherein the plurality of generated virtual viewpoint images includes a first virtual viewpoint image to be output to a first apparatus that displays the first virtual viewpoint image for a first user designating a virtual viewpoint and a second virtual viewpoint image which (i) is an image generated based on the virtual viewpoint designated by the first user using the first virtual viewpoint image displayed on the first apparatus, (ii) is output to a second apparatus different from the first apparatus and that displays the second virtual image for the second user different from the first user and (iii) has a larger image data size per frame of a moving image than that of the first virtual viewpoint image.

16. The image processing method according to claim 15, wherein a time when the first virtual viewpoint image is output is earlier than a time when the second virtual viewpoint image is output.

17. A non-transitory storage medium that stores a program for causing a computer to execute an image processing method, the image processing method comprising:
obtaining images based on image capturing by a plurality of image capturing apparatuses at different positions;
receiving an input according to an operation for designating a virtual viewpoint;
generating a plurality of virtual viewpoint images, each of which is generated based on a basis of the obtained images and the received input,
obtaining images based on image capturing by a plurality of image capturing apparatuses at different positions;
receiving an input according to an operation for designating a virtual viewpoint;
generating a plurality of virtual viewpoint images, each of which is generated based on a basis of the obtained images and the received input,
wherein the plurality of generated virtual viewpoint images includes a first virtual viewpoint image to be output to a first apparatus that displays the first virtual viewpoint image for a first user designating a virtual viewpoint and a second virtual viewpoint image which (i) is an image generated based on the virtual viewpoint designated by the first user using the first virtual viewpoint image displayed on the first apparatus, (ii) is output to a second apparatus different from the first apparatus and that displays the second virtual image for the second user different from the first user and (iii) has a larger image data size per frame of a moving image than that of the first virtual viewpoint image.

* * * * *